United States Patent
Shin et al.

(10) Patent No.: US 11,814,513 B2
(45) Date of Patent: Nov. 14, 2023

(54) THERMOPLASTIC RESIN COMPOSITION AND MOLDED PRODUCT USING SAME

(71) Applicant: LOTTE CHEMICAL CORPORATION, Seoul (KR)

(72) Inventors: Hyeongseob Shin, Uiwang-si (KR); In-Chol Kim, Uiwang-si (KR); Keehae Kwon, Uiwang-si (KR)

(73) Assignee: Lotte Chemical Corporation, Seoul (KR)

(*) Notice: Subject to any disclaimer, the term of this patent is extended or adjusted under 35 U.S.C. 154(b) by 274 days.

(21) Appl. No.: 17/289,364

(22) PCT Filed: Oct. 28, 2019

(86) PCT No.: PCT/KR2019/014266
§ 371 (c)(1),
(2) Date: Apr. 28, 2021

(87) PCT Pub. No.: WO2020/091338
PCT Pub. Date: May 7, 2020

(65) Prior Publication Data
US 2021/0395510 A1  Dec. 23, 2021

(30) Foreign Application Priority Data
Oct. 31, 2018  (KR) .................. 10-2018-0132448

(51) Int. Cl.
| | | |
|---|---|---|
| C08L 51/04 | (2006.01) | |
| C08F 265/06 | (2006.01) | |
| C08L 25/12 | (2006.01) | |
| C08L 33/12 | (2006.01) | |
| C08L 35/06 | (2006.01) | |

(52) U.S. Cl.
CPC .......... *C08L 51/04* (2013.01); *C08F 265/06* (2013.01); *C08L 25/12* (2013.01); *C08L 33/12* (2013.01); *C08L 35/06* (2013.01); *C08L 2205/035* (2013.01); *C08L 2205/18* (2013.01); *C08L 2207/53* (2013.01)

(58) Field of Classification Search
CPC .......... C08L 51/04; C08L 33/12; C08L 25/12; C08L 2205/03
See application file for complete search history.

(56) References Cited

U.S. PATENT DOCUMENTS

| | | | | |
|---|---|---|---|---|
| 5,053,456 A | * | 10/1991 | Dufour | ............... C08L 35/06 |
| | | | | 525/74 |
| 2003/0013829 A1 | | 1/2003 | Marutani et al. | |
| 2007/0222117 A1 | | 9/2007 | Hoess et al. | |
| 2012/0015141 A1 | | 1/2012 | Hoess et al. | |
| 2014/0187719 A1 | | 7/2014 | Kim et al. | |
| 2016/0002455 A1 | | 1/2016 | Chung et al. | |
| 2018/0265690 A1 | | 9/2018 | Kim et al. | |

FOREIGN PATENT DOCUMENTS

| | | | |
|---|---|---|---|
| CN | 102471559 A | 5/2012 | |
| CN | 104603198 A | 5/2015 | |
| CN | 104845026 A | 8/2015 | |
| CN | 107841077 A | 3/2018 | |
| EP | 2463337 A2 | 6/2012 | |
| JP | 2001-270905 A | 10/2001 | |
| KR | 10-2007-0034466 A | 7/2012 | |
| KR | 10-2010-0062643 A | 9/2012 | |
| KR | 10-2011-0039910 A | 7/2013 | |
| KR | 10-2014-0005510 A | 1/2015 | |
| KR | 10-2014-0092735 A | 9/2016 | |
| KR | 10-2017-0062984 A | 12/2018 | |
| WO | 2020/091338 A | 5/2020 | |

OTHER PUBLICATIONS

International Search Report in counterpart International Application No. PCT/KR2019/014266 dated Feb. 7, 2020, pp. 1-6.
Office Action dated Jan. 31, 2023 (including Search Report dated Jan. 29, 2023) in counterpart Chinese Patent Application No. 201980083270.4, pp. 1-7.
Partial English-translation of Office Action dated Jan. 31, 2023 (including Search Report dated Jan. 29, 2023) in counterpart Chinese Patent Application No. 201980083270.4, pp. 1-7.
Decision of Rejection dated Jul. 19, 2023 of the counterpart Chinese Patent Application No. 201980083270.4, pp. 1-4.
English translation of Decision of Rejection dated Jul. 19, 2023 of the counterpart Chinese Patent Application No. 201980083270.4, pp. 1-7.

* cited by examiner

*Primary Examiner* — Jeffrey C Mullis
(74) *Attorney, Agent, or Firm* — Additon, Pendleton & Witherspoon, P.A.

(57) ABSTRACT

Provided are a thermoplastic resin composition and a molded product using same, the thermoplastic resin composition comprising: (A) 30 to 50 wt % of an acrylate-based graft copolymer; (B) 20 to 50 wt % of a poly(methyl methacrylate) resin; (C) 0 to 40 wt % of a methyl methacrylate-styrene-acrylonitrile copolymer; and (D) 5 to 15 wt % of a styrene-methyl methacrylate-maleic anhydride copolymer having a maleic anhydride-derived component content of 20 to 25 wt %.

15 Claims, No Drawings

THERMOPLASTIC RESIN COMPOSITION AND MOLDED PRODUCT USING SAME

TECHNICAL FIELD

The present invention relates to a thermoplastic resin composition and a molded product using the same.

BACKGROUND ART

Recently, thermoplastic resins, which are widely applied to electric and electronic products, automobiles, construction materials, leisure products, and the like, have been rapidly replacing existing glass or metal products. Accordingly, there is an increasing demand for a thermoplastic resin capable of realizing excellent impact resistance, weather resistance, molding processability, and high-quality appearance.

In general, when an acrylonitrile-butadiene-styrene copolymer resin (hereinafter, ABS resin) as the thermoplastic resin is used, the ABS resin includes a chemically unstable double bond in a rubber component, which may be easily aged by ultraviolet (UV) rays, and thus exhibits insufficient weather resistance and light resistance. Accordingly, when left outdoors for a long time, the ABS resin exhibits significant discoloring and property deterioration over time and thus may not be suitable for outdoor uses when exposed to sunlight.

On the contrary, an acrylonitrile-styrene-acrylate copolymer resin (hereinafter, ASA resin) uses a chemically stable acrylate-based rubber polymer instead of the butadiene-based rubber polymer as the rubber component, and thus is known as an alternative capable of solving the discoloring and property deterioration problems of the ABS resin according to the aging due to the ultraviolet (UV) rays. In addition, the ASA resin has excellent moldability, chemical resistance, thermal stability, and the like as well as weather resistance and light resistance.

In accordance with the recent eco-friendly trend, a demand for unpainted thermoplastic resins used without a painting process is increasing. The unpainted thermoplastic resins should have excellent scratch resistance, coloring properties, impact resistance, weather resistance, and the like, for molded products made by using the same are used as they are, and in addition, as a demand level of physical properties has been recently increased, attempts to apply ASA/PMMA alloy resins prepared by mixing the ASA resin with a poly(methyl methacrylate) resin (hereinafter, PMMA resin) are increasing.

However, the ASA/PMMA alloy resins lack impact resistance and heat resistance, compared with the ASA resins, and in particular, when general heat resistance enhancers are used to compensate for the heat resistance, since transparency and coloring properties of molded products decrease due to a refractive index difference between continuous phase and dispersed phase (domain), a colorant such as a pigment, a dye, and the like may be used in an excessive amount for coloring the molded products.

Accordingly, there is a need for research on a thermoplastic resin composition simultaneously having excellent impact resistance, heat resistance, and coloring properties.

DISCLOSURE

Technical Problem

An embodiment provides a thermoplastic resin composition capable of implementing an ASA/PMMA alloy resin having excellent impact resistance, heat resistance, and coloring properties.

Another embodiment provides a molded product using the thermoplastic resin composition.

Technical Solution

According to an embodiment, a thermoplastic resin composition includes: (A) 30 to 50 wt % of an acrylate-based graft copolymer; (B) 20 to 50 wt % of a poly(methyl methacrylate) resin; (C) 0 to 40 wt % of a methyl methacrylate-styrene-acrylonitrile copolymer; and (D) 5 to 15 wt % of a styrene-methyl methacrylate-maleic anhydride copolymer having 20 to 25 wt % of a maleic anhydride-derived component content.

The (A) acrylate-based graft copolymer may include a core including an acrylate-based rubbery polymer, and a shell formed by grafting a monomer mixture including an aromatic vinyl compound and a vinyl cyanide compound to the core.

The acrylate-based rubbery polymer may be a crosslinked polymer of monomers including ethyl acrylate, butyl acrylate, 2-ethylhexyl acrylate, hexyl acrylate, or a combination thereof.

20 to 60 wt % of the acrylate-based rubbery polymer may be included based on 100 wt % of the (A) acrylate-based graft copolymer.

The shell may be a copolymer of a monomer mixture including an aromatic vinyl compound and a vinyl cyanide compound in a weight ratio of 5:5 to 8:2.

The acrylate-based rubbery polymer may have an average particle diameter of 200 to 400 nm.

The (A) acrylate-based graft copolymer may be an acrylonitrile-styrene-acrylate graft copolymer.

The (B) poly(methyl methacrylate) resin may have a glass transition temperature of 100 to 150° C.

The (C) methyl methacrylate-styrene-acrylonitrile copolymer may be included in an amount of 10 to 35 wt % based on 100 wt % of a sum of the components (A) to (D).

The (C) methyl methacrylate-styrene-acrylonitrile copolymer may be a copolymer of a monomer mixture including 60 to 80 wt % of methyl methacrylate, 10 to 30 wt % of styrene, and greater than 0 wt % and less than or equal to 10 wt % of acrylonitrile.

The (C) methyl methacrylate-styrene-acrylonitrile copolymer may have a weight average molecular weight of 50,000 to 200,000 g/mol.

The (D) styrene-methyl methacrylate-maleic anhydride copolymer may be a copolymer of a monomer mixture including 50 to 75 wt % of styrene, greater than 0 wt % and less than or equal to 25 wt % of methyl methacrylate, and 20 to 25 wt % of maleic anhydride.

The (D) styrene-methyl methacrylate-maleic anhydride copolymer may have a glass transition temperature of 120 to 180° C.

The thermoplastic resin composition may further include at least one additive selected from flame retardants, nucleating agents, coupling agents, fillers, plasticizers, impact modifiers, lubricants, antibacterial agents, release agents, heat stabilizers, antioxidants, inorganic additives, ultraviolet stabilizers, antistatic agents, pigments, and dyes.

Meanwhile, according to another embodiment, a molded product using the aforementioned thermoplastic resin composition is provided.

Advantageous Effects

The thermoplastic resin composition having excellent impact resistance, heat resistance, and coloring properties, and a molded product using the same, are provided.

MODE FOR INVENTION

Hereinafter, embodiments of the present invention are described in detail. However, these embodiments are exemplary, the present invention is not limited thereto, and the present invention is defined by the scope of claims.

In the present invention, unless otherwise mentioned, the average particle diameter means a Z-average particle diameter measured using a dynamic light scattering analyzer.

An embodiment provides a thermoplastic resin composition having improved impact resistance, heat resistance, and coloring properties.

The thermoplastic resin composition includes: (A) 30 to 50 wt % of an acrylate-based graft copolymer; (B) 20 to 50 wt % of a poly(methyl methacrylate) resin; (C) 0 to 40 wt % of a methyl methacrylate-styrene-acrylonitrile copolymer; and (D) 5 to 15 wt % of a styrene-methyl methacrylate-maleic anhydride copolymer.

Hereinafter, each component included in the thermoplastic resin composition will be described in detail.

(A) Acrylate-Based Graft Copolymer

In an embodiment, the (A) acrylate-based graft copolymer may be prepared by graft polymerization of a monomer mixture including an aromatic vinyl compound and a vinyl cyanide compound on a core including an acrylate-based rubbery polymer.

The (A) acrylate-based graft copolymer may be prepared according to any preparing method known to a person skilled in the art.

As the preparing method, conventional polymerization methods, for example, emulsion polymerization, suspension polymerization, solution polymerization, and bulk polymerization, may be used. As a non-limiting example, it may be prepared by a method that includes preparing an acrylate-based rubbery polymer, and graft-polymerizing a monomer mixture including an aromatic vinyl compound and a vinyl cyanide compound on a core formed with one or more layers of the acrylate-based rubbery polymer to form a shell of one or more layers.

The acrylate-based rubbery polymer may be a crosslinked polymer prepared using an acrylate-based monomer as a main monomer. The acrylate-based monomer may be, for example, ethyl acrylate, butyl acrylate, 2-ethylhexyl acrylate, hexyl acrylate, or a combination thereof.

The acrylate-based monomer may be copolymerized with one or more radically polymerizable monomers. When copolymerized, the amount of the one or more radically polymerizable monomers may be 5 to 30 wt %, and specifically 10 to 20 wt %, based on the total weight of the acrylate-based rubbery polymer.

The aromatic vinyl compound included in the shell may be at least one selected from styrene, α-methylstyrene, p-methylstyrene, p-t-butylstyrene, 2,4-dimethylstyrene, chlorostyrene, vinyltoluene, and vinylnaphthalene, but is not limited thereto.

The vinyl cyanide compound included in the shell may be at least one selected from acrylonitrile, methacrylonitrile, and fumaronitrile, but is not limited thereto.

The acrylate-based rubbery polymer may be 20 to 60 wt %, for example 30 to 60 wt %, for example 40 to 60 wt %, based on 100 wt % of the (A) acrylate-based graft copolymer.

In a shell formed by graft polymerization of a monomer mixture including the aromatic vinyl compound and the vinyl cyanide compound to the rubbery polymer, the shell may be a copolymer of a monomer mixture including the aromatic vinyl compound and the vinyl cyanide compound in a weight ratio of 5:5 to 8:2, and specifically 5:5 to 7:3.

In an embodiment, the (A) acrylate-based graft copolymer may be an acrylonitrile-styrene-acrylate graft copolymer.

In an embodiment, the (A) acrylate-based graft copolymer may include the acrylate-based rubbery polymer having an average particle diameter of, for example, 200 to 400 nm.

When the average particle diameter of the acrylate-based rubbery polymer is within the above range, mechanical properties such as impact resistance and tensile strength and processability of the thermoplastic resin composition including the same may be improved.

The (A) acrylate-based graft copolymer may be included in an amount of greater than or equal to 30 wt %, for example greater than or equal to 35 wt %, and for example less than or equal to 50 wt %, for example less than or equal to 45 wt %, for example 30 to 50 wt %, and for example 35 to 45 wt % based on 100 wt % of the sum of components (A) to (D).

When the amount of the (A) acrylate-based graft copolymer is less than 30 wt %, the impact resistance of the thermoplastic resin composition may be deteriorated, and when it exceeds 50 wt %, the mechanical stiffness and coloring properties of the thermoplastic resin composition may be deteriorated.

(B) Poly(methyl methacrylate) Resin

In an embodiment, the (B) poly(methyl methacrylate) resin may be obtained by polymerizing a raw material monomer by a known polymerization method such as a suspension polymerization method, a bulk polymerization method, and an emulsion polymerization method.

In an embodiment, the (B) poly(methyl methacrylate) resin may be a copolymer of methyl methacrylate and methyl acrylate. In this case, the poly(methyl methacrylate) resin may be a copolymer of a monomer mixture including 80 to 99 wt % of the methyl methacrylate and 1 to 20 wt % of the methyl acrylate.

In an embodiment, the (B) glass transition temperature of the poly(methyl methacrylate) resin may be 100 to 150° C., and specifically 110 to 130° C.

In an embodiment, the (B) poly(methyl methacrylate) resin may have a refractive index of 1.480 to 1.495, and specifically 1.485 to 1.490. A difference in refractive index between the (B) poly(methyl methacrylate) resin and the (A) acrylate-based graft copolymer may be 0.001 to 0.2, and specifically 0.006 to 0.01.

When the above range is satisfied, the difference in refractive index between the continuous phase and the dispersed phase may be minimized, so that the thermoplastic resin composition has excellent transparency and excellent coloring properties. The refractive index is a value measured using a spectroscopic ellipsometer, which is a refractive index measuring instrument manufactured by J.A. Woollam.

The (B) poly(methyl methacrylate) resin may have a weight average molecular weight of 50,000 to 200,000 g/mol, and specifically 70,000 to 150,000 g/mol. The weight average molecular weight is a molecular weight in terms of polystyrene measured using gel permeation chromatography. When satisfying the above range, the thermoplastic resin composition may exhibit excellent scratch resistance and processability.

The (B) poly(methyl methacrylate) resin may be included in an amount of greater than or equal to 20 wt %, for example greater than or equal to 25 wt % and for example less than or equal to 50 wt %, for example less than or equal to 45 wt %, for example less than or equal to 40 wt %, for example less than or equal to 35 wt %, for example 20 to 50 wt %, for example 20 to 40 wt %, and for example 25 to 35 wt %, based on 100 wt % of the sum of components (A) to (D).

When the (B) poly(methyl methacrylate) resin is less than 20 wt %, the coloring properties, scratch resistance, and weather resistance of the thermoplastic resin composition may decrease, while when it exceeds 50 wt %, mechanical properties such as impact resistance, etc. may be deteriorated.

(C) Methyl methacrylate-styrene-acrylonitrile Copolymer

The (C) methyl methacrylate-styrene-acrylonitrile copolymer is a terpolymer of methyl methacrylate, styrene, and acrylonitrile.

The (C) methyl methacrylate-styrene-acrylonitrile copolymer is a copolymer of a monomer mixture including 60 to 80 wt % of methyl methacrylate, 10 to 30 wt % of styrene, and greater than 0 wt % and less than or equal to 10 wt % of acrylonitrile. When the above range is satisfied, compatibility between each component constituting the thermoplastic resin composition may be improved, and thus physical property balance may be improved.

The (C) methyl methacrylate-styrene-acrylonitrile copolymer may have a weight average molecular weight of 50,000 to 200,000 g/mol, for example 60,000 to 200,000 g/mol, for example 70,000 to 180,000 g/mol, for example 80,000 to 160,000 g/mol, for example 80,000 to 140,000 g/mol, for example 80,000 to 120,000 g/mol, and for example 90,000 to 120,000 g/mol. When the weight average molecular weight of the (C) methyl methacrylate-styrene-acrylonitrile copolymer is within the above range, morphology between each of components constituting the thermoplastic resin composition may be stable without impairing the fluidity of the thermoplastic resin composition in the shear rate region during injection molding.

The (C) methyl methacrylate-styrene-acrylonitrile copolymer may be omitted in consideration of the content and balance of properties of other components. When included, it may be included in an amount of greater than or equal to 5 wt %, for example greater than or equal to 10 wt %, and for example, less than or equal to 40 wt %, for example, less than or equal to 35 wt %, for example, 0 to 40 wt %, and for example 10 to 35 wt % based on 100% by weight of the sum of components (A) to (D).

When the (C) methyl methacrylate-styrene-acrylonitrile copolymer exceeds 40 wt %, the heat resistance of the thermoplastic resin composition may be deteriorated.

(D) Styrene-methyl methacrylate-maleic anhydride Copolymer

The (D) styrene-methyl methacrylate-maleic anhydride copolymer according to an embodiment may improve heat resistance of a thermoplastic resin composition including the (A) acrylate-based graft copolymer and the (B) poly(methyl methacrylate) resin and may be a terpolymer of styrene, methyl methacrylate, and maleic anhydride.

In an embodiment, the (D) styrene-methyl methacrylate-maleic anhydride copolymer may be a copolymer of a monomer mixture including the maleic anhydride in an amount of 20 to 25 wt %, for example 21 to 25 wt %. When the maleic anhydride is included in the above-described range, excellent heat resistance may be exhibited without deteriorating the impact resistance and coloring properties of the thermoplastic resin composition according to an embodiment.

On the other hand, in an embodiment, the (D) styrene-methyl methacrylate-maleic anhydride copolymer may be a copolymer of a monomer mixture including 50 to 75 wt % of styrene, greater than 0 wt % and less than or equal to 25 wt % of methyl methacrylate, and 20 to 25 wt % of maleic anhydride.

The (D) styrene-methyl methacrylate-maleic anhydride copolymer may have a glass transition temperature of, for example, 120 to 180° C., for example 130 to 170° C., and for example, 140 to 160° C.

The (D) styrene-methyl methacrylate-maleic anhydride copolymer may be included in an amount of 5 to 10 wt % based on 100 wt % of the sum of components (A) to (D).

When the content of the (D) styrene-methyl methacrylate-maleic anhydride copolymer satisfies the above range, excellent heat resistance may be exhibited without deteriorating the impact resistance and coloring properties of the thermoplastic resin composition according to an embodiment.

(E) Other Additives

In addition to the components (A) to (D), the thermoplastic resin composition according to an embodiment may further include one or more additives in order to balance the physical properties under conditions capable of excellently maintaining other properties during processing or use, or according to the end use of the thermoplastic resin composition.

Specifically, the additives may include flame retardants, nucleating agents, coupling agents, fillers, plasticizers, impact modifiers, lubricants, antibacterial agents, release agents, heat stabilizers, antioxidants, inorganic additives, ultraviolet stabilizers, antistatic agents, pigments, dyes, etc. These may be used alone or in combination of two or more.

These additives may be appropriately included within a range that does not impair the physical properties of the thermoplastic resin composition, and specifically, may be included in an amount of less than or equal to 20 parts by weight based on 100 parts by weight of the sum of the components (A) to (D), but are limited thereto.

Meanwhile, the thermoplastic resin composition according to an embodiment may be mixed with other resins or other rubber components and used together.

On the other hand, another embodiment provides a molded product including the thermoplastic resin composition according to the embodiment. The molded product may be manufactured by various methods known in the art, such as injection molding and extrusion molding, using the thermoplastic resin composition.

The molded product may be advantageously used for various electric and electronic parts, construction materials, leisure products, automobile parts, etc. which are used outdoors.

Particularly, the molded products may be used as exterior parts for automobiles capable of non-painting, and specifically, may be used for automobile door pillars, radiator grills, side mirror housings, and the like. However, the use of the molded product is not limited thereto.

Hereinafter, preferred examples of the present invention will be described. These examples, however, are not in any sense to be interpreted as limiting the scope of the invention.

Examples 1 to 4 and Comparative Examples 1 to 7

Pellet-type thermoplastic resin compositions were prepared by mixing the components shown in Table 1 and a black dye for facilitating an evaluation for coloring properties with a conventional mixer, and then extruding the obtained mixture with a twin-screw extruder having L/D=29 and Φ=45 mm at a barrel temperature of 230° C.

The prepared pellets were dried in a dehumidifying drier at 80° C. for 4 hours before injection molding, and then made into specimens for measuring properties and a color difference with a 6 oz injection molding machine by setting a cylinder temperature at 230° C. and a mold temperature at 60° C. The measured properties are shown in Table 2.

TABLE 1

| Components | Examples | | | | Comparative Examples | | | | | | |
|---|---|---|---|---|---|---|---|---|---|---|---|
| | 1 | 2 | 3 | 4 | 1 | 2 | 3 | 4 | 5 | 6 | 7 |
| (A) acrylate-based graft copolymer | 35 | 35 | 35 | 45 | 35 | 35 | 25 | 55 | 35 | 35 | 35 |
| (B) poly(methyl methacrylate) resin | 25 | 35 | 50 | 35 | 10 | 45 | 40 | 35 | 35 | 35 | 25 |
| (C) methyl methacrylate-styrene-acrylonitrile copolymer | 35 | 20 | 0 | 10 | 55 | 0 | 25 | 0 | 20 | 20 | 35 |
| (C¹) α-methylstyrene-styrene-acrylonitrile copolymer | 0 | 0 | 0 | 0 | 0 | 0 | 0 | 0 | 0 | 10 | 0 |
| (D) styrene-methyl methacrylate-maleic anhydride copolymer | 5 | 10 | 15 | 10 | 0 | 20 | 10 | 10 | 0 | 0 | 0 |
| (D') styrene-methyl methacrylate-maleic anhydride copolymer | 0 | 0 | 0 | 0 | 0 | 0 | 0 | 0 | 0 | 0 | 5 |
| (D") N-phenyl maleimide-styrene-maleic anhydride copolymer | 0 | 0 | 0 | 0 | 0 | 0 | 0 | 0 | 10 | 0 | 0 |
| (E) black dye | 0.5 | 0.5 | 0.5 | 0.5 | 0.5 | 0.5 | 0.5 | 0.5 | 0.5 | 0.5 | 0.5 |

In Table 1 all components except for the component (E) were expressed by wt %, and the component (E) was expressed by a part by weight based on 100 parts by weight of a sum of the components (A) to (D).

(A): An acrylonitrile-styrene-acrylate graft copolymer (g-ASA) including about 50 wt % of a core including a butyl acrylate rubbery polymer having an average particle diameter of about 380 nm and a shell grafted onto the core with styrene and acrylonitrile in a weight ratio of 7:3 was used. (Manufacturer: Lotte Advanced Materials)

(B): A poly(methyl methacrylate) resin having a glass transition temperature of about 120° C., a refractive index of about 1.490, and a weight average molecular weight of about 85,000 g/mol was used. (Manufacturer: ARKEMA)

(C): A methyl methacrylate-styrene-acrylonitrile copolymer obtained by copolymerizing a monomer mixture of 21 wt % of styrene, 74 wt % of methyl methacrylate, and 5 wt % of acrylonitrile and having a weight average molecular weight of about 120,000 g/mol was used. (Manufacturer: Lotte Advanced Materials)

(C'): An α-methylstyrene-styrene-acrylonitrile copolymer obtained by copolymerizing 54 wt % of α-methylstyrene, 19 wt % of styrene, and 27 wt % of acrylonitrile was used. (Manufacturer: Lotte Advanced Materials)

(D): A styrene-methyl methacrylate-maleic anhydride copolymer obtained by copolymerizing a monomer mixture of 70 wt % of styrene, 8 wt % of methyl methacrylate, and 22 wt % of maleic anhydride and having a glass transition temperature of about 150° C. was used. (Manufacturer: DENKA, product name: R-310)

(D'): A styrene-methyl methacrylate-maleic anhydride copolymer obtained by copolymerizing a monomer mixture of 65 wt % of styrene, 20 wt % of methyl methacrylate, and 15 wt % of maleic anhydride was used. (Manufacturer: DENKA, product name: R-100)

(D"): An N-phenyl maleimide-styrene-maleic anhydride copolymer having a weight average molecular weight of about 125,000 g/mol and a glass transition temperature of about 196° C. was used. (Manufacturer: DENKA, product name: MS-NB)

(E): A black dye prepared by mixing an anthraquinone-based blue dye and a quinoline-based yellow dye was used.

Evaluation

The impact resistance, heat resistance, and coloring properties of the specimens according to Examples 1 to 4 and Comparative Examples 1 to 7 were measured by the following evaluation method, and are shown in Table 2.

1. Impact Resistance (Unit: kgf·cm/cm)

Izod impact strength was measured according to ASTM D256 standard on a ¼" thick specimen with a notch.

2. Heat Resistance (Unit: ° C.)

Vicat softening temperature (VST) was measured according to ISO 306/B50 standard.

3. Coloring Properties

A Konica Minolta CM-3700d spectrophotometer was used to measure lightness (L*) of 2.5 mm-thick specimens in a specular component excluded (SCE) method according to ASTM E308. The lower the lightness, the better the black color, which was evaluated as excellent coloring properties.

TABLE 2

| Components | Examples | | | | Comparative Examples | | | | | | |
|---|---|---|---|---|---|---|---|---|---|---|---|
| | 1 | 2 | 3 | 4 | 1 | 2 | 3 | 4 | 5 | 6 | 7 |
| Izod Impact strength (kgf · cm/cm) | 8.2 | 8.4 | 8.3 | 9.5 | 8.4 | 8.1 | 6.5 | 10.2 | 6.3 | 8.3 | 8.1 |
| VST (° C.) | 97.1 | 98.4 | 99.1 | 96.3 | 93.0 | 99.7 | 103.0 | 93.7 | 98.6 | 96.5 | 95.3 |
| L* | 1.4 | 1.3 | 1.4 | 1.5 | 1.4 | 2.5 | 1.2 | 1.7 | 7.5 | 6.3 | 1.4 |

Referring to Tables 1 to 2, a thermoplastic resin composition including an acrylate-based graft copolymer, a poly(methyl methacrylate) resin, a methyl methacrylate-styrene-acrylonitrile copolymer, and a styrene-methyl methacrylate-maleic anhydride copolymer including 20 to 25 wt % of maleic anhydride and a molded product using the same exhibited excellent impact resistance, heat resistance, and coloring properties.

As described above, the present invention has been described through preferred embodiments, but a person having ordinary skill would understand easily that the present invention is not limited thereto, and various modifications and variations may be possible without departing from the concept and scope of the following claims.

The invention claimed is:

1. A thermoplastic resin composition, comprising:
   (A) 30 to 50 wt % of an acrylate-based graft copolymer;
   (B) 20 to 50 wt % of a poly(methyl methacrylate) resin;
   (C) 0 to 40 wt % of a methyl methacrylate-styrene-acrylonitrile copolymer; and
   (D) 5 to 15 wt % of a styrene-methyl methacrylate-maleic anhydride copolymer including 20 to 25 wt % of a maleic anhydride-derived component.

2. The thermoplastic resin composition of claim 1, wherein
   the (A) acrylate-based graft copolymer comprises a core including an acrylate-based rubbery polymer, and
   a shell formed by grafting a monomer mixture including an aromatic vinyl compound and a vinyl cyanide compound to the core.

3. The thermoplastic resin composition of claim 2, wherein the acrylate-based rubbery polymer is a crosslinked polymer of monomers including ethyl acrylate, butyl acrylate, 2-ethylhexyl acrylate, hexyl acrylate, or a combination thereof.

4. The thermoplastic resin composition of claim 2, wherein the (A) acrylate-based graft copolymer includes 20 to 60 wt % of the acrylate-based rubbery polymer based on 100 wt % of the (A) acrylate-based graft copolymer.

5. The thermoplastic resin composition of claim 2, wherein the shell is a copolymer of a monomer mixture including an aromatic vinyl compound and a vinyl cyanide compound in a weight ratio of 5:5 to 8:2.

6. The thermoplastic resin composition of claim 2, wherein the acrylate-based rubbery polymer has an average particle diameter of 200 to 400 nm.

7. The thermoplastic resin composition of claim 1, wherein the (A) acrylate-based graft copolymer is an acrylonitrile-styrene-acrylate graft copolymer.

8. The thermoplastic resin composition of claim 1, wherein the (B) poly(methyl methacrylate) resin has a glass transition temperature of 100 to 150° C.

9. The thermoplastic resin composition of claim 1, comprising the (C) methyl methacrylate-styrene-acrylonitrile copolymer in an amount of 10 to 35 wt % based on 100 wt % of a sum of the components (A) to (D).

10. The thermoplastic resin composition of claim 1, wherein the (C) methyl methacrylate-styrene-acrylonitrile copolymer is a copolymer of a monomer mixture including 60 to 80 wt % of methyl methacrylate, 10 to 30 wt % of styrene, and greater than 0 wt % and less than or equal to 10 wt % of acrylonitrile.

11. The thermoplastic resin composition of claim 1, wherein the (C) methyl methacrylate-styrene-acrylonitrile copolymer has a weight average molecular weight of 50,000 to 200,000 g/mol.

12. The thermoplastic resin composition of claim 1, wherein the (D) styrene-methyl methacrylate-maleic anhydride copolymer is a copolymer of a monomer mixture including 50 to 75 wt % of styrene, greater than 0 wt % and less than or equal to 25 wt % of methyl methacrylate, and 20 to 25 wt % of maleic anhydride.

13. The thermoplastic resin composition of claim 1, wherein the (D) styrene-methyl methacrylate-maleic anhydride copolymer has a glass transition temperature of 120 to 180° C.

14. The thermoplastic resin composition of claim 1, which further comprises at least one additive selected from flame retardants, nucleating agents, coupling agents, fillers, plasticizers, impact modifiers, lubricants, antibacterial agents, release agents, heat stabilizers, antioxidants, inorganic additives, ultraviolet stabilizers, antistatic agents, pigments, and dyes.

15. A molded product using the thermoplastic resin composition of claim 1.

* * * * *